United States Patent [19]

Chen et al.

[11] Patent Number: 5,392,430
[45] Date of Patent: Feb. 21, 1995

[54] HIERARCHICAL SCHEDULING METHOD FOR PROCESSING TASKS HAVING PRECEDENCE CONSTRAINTS ON A PARALLEL PROCESSING SYSTEM

[75] Inventors: Ming-Syan Chen, Yorktown Heights; John J. E. Turek, Chappaqua; Joel L. Wolf, Katonah; Philip S. Yu, Chappaqua, all of N.Y.

[73] Assignee: International Business Machines, Armonk, N.Y.

[21] Appl. No.: 968,717
[22] Filed: Oct. 30, 1992
[51] Int. Cl.$^6$ .............................................. G06F 9/46
[52] U.S. Cl. ........................... 395/650; 364/DIG. 1; 364/281.8; 364/281.6; 364/228.3
[58] Field of Search .............................. 395/600, 650; 364/DIG. 1, DIG. 2 MS File

[56] References Cited

U.S. PATENT DOCUMENTS

| | | | |
|---|---|---|---|
| 3,648,253 | 3/1972 | Mullery et al. | 364/DIG. 1 |
| 3,916,383 | 10/1975 | Malcolm | 364/DIG. 1 |
| 4,642,756 | 2/1987 | Sherrod | 364/DIG. 1 |

OTHER PUBLICATIONS

"An Approximation Algorithm For Scheduling Tasks On Varying Partition Sizes In Partitionable Multipocessor Systems", R. Krishnamurti and E. Ma, Research Report, RC 15900 (#70682) Jul. 3, 1990.

"An Effective Algorithm For Parallelizing Sort Merge Joins In The Presence Of Data Skew", IEEE, Proceedings of the Second International Symposium On Databases In Parallel and Distributed Systems, Dublin, Ireland, Jul. 2–4, 1990. (J. Wolf, D. Dias and P. Yu).

"An Effective Algorithm For Parallelizing Hash Joins In The Presence Of Data Skew", J. Wolf, D. Dias, P. Yu and J. Turek, Proceedings Of The Seventh International Conference On Data Engineering, Kobe, Japan, Apr. 8–12, 1991.

"Percentile Finding Algorithm For Multiple Sorted Runs", B. Iyer, G. Ricard, P. Varman, Proceedings Of The Fifteenth International Conference On Very Large Data Bases, Amsterdam, Netherlands, Aug. 1989.

"Complexity of Scheduling Parallel Task Systems", SIAM Journal Of Discrete Mathematics, J. Du and Y. T. Leung (1989).

"Scheduling And Processor Allocation For Parallel Execution Of Multi–Join Queries", M. S. Chen, P. S. Yu, K. L. Wu, Proceddings of the IEEE Conference On Data Engineering (1992).

"Approximate Algorithms For Scheduling Parallelizable Tasks", J. J. Turek, J. L. Wolf, P. S. Yu, Proceedings On the Symposium On Parallel Algorithms and Architectures, 1992.

"Scheduling Parallelizable Tasks: Putting It all On The Shelf", J. J. Turek, J. L. Wolf, K. Pattipati and P. S. Yu, Proceedings of the ACM Sigmetrics Conference, 1992.

*Primary Examiner*—Thomas M. Heckler
*Attorney, Agent, or Firm*—Ronald L. Drumheller; Richard M. Ludwin

[57] ABSTRACT

A plurality of queries (jobs) which consist of sets of tasks with precedence constraints between them are optimally scheduled in two stages of scheduling for processing on a parallel processing system. In a first stage of scheduling, multiple optimum schedules are created for each job, one optimum schedule for each possible number of processors which might be used to execute each job, and an estimated job execution time is determined for each of the optimum schedules created for each job, thereby producing a set of estimated job execution times for each job which are a function of the number of processors used for the job execution. Precedence constraints between tasks in each job are respected in creating all of these optimum schedules. Any known optimum scheduling method for parallel processing tasks that have precedence constraints among tasks may be used but a novel preferred method is also disclosed. The second stage of scheduling utilizes the estimated job execution times determined in the first stage of scheduling to create an overall optimum schedule for the jobs. The second stage of scheduling does not involve precedence constraints because the precedence constraints are between tasks within the same job and not between tasks in separate jobs, so jobs may be scheduled without observing any precedence constraints. Any known optimum scheduling method for the parallel processing of jobs that have no precedence constraints may be used, but a novel preferred method is also disclosed.

9 Claims, 7 Drawing Sheets

HIERARCHICAL SCHEDULING METHOD FOR PROCESSING TASKS HAVING PRECEDENCE CONSTRAINTS ON A PARALLEL PROCESSING SYSTEM

FIELD OF THE INVENTION

This invention generally relates to scheduling a plurality of tasks for execution on a parallel processing computer system so that the completion time of the last task to finish is minimized and more specifically scheduling such tasks where there may be precedence constraints among the tasks while simultaneously respecting such precedence constraints in the schedule. The tasks might be, for example, individual steps within a plurality of database queries.

BACKGROUND OF THE INVENTION

Requests for information from n database (typically called "database queries") generally involve a number of steps (herein called "tasks") and often the results of one or more tasks in a query (hereinafter called "job") are used in a latex task in the same job. This is called a precedence constraint because any such earlier task(s) within a job (which produce a result that is used in another task) must be completed before (i.e., must "precede") the start of execution of any such later task which uses such a result.

A parallel processing system provides a plurality of processing elements, each of which can execute a whole task of a job or a portion of such a task at the same time that the other processing elements are processing other tasks or task portions of the same or different task or job. When multiple jobs are to be scheduled for execution simultaneously on a parallel processing system, the objective typically is to create a schedule that results in completion of the last task of the total number of tasks in all of the jobs in the minimum amount of time, while respecting all of the precedence constraints among tasks of course.

For purposes of this invention, it is assumed that each processing clement in the parallel processing system (hereinafter called a "processor" rather than a processing element) will process only a single task (either alone or in combination with one or more other processors) at one time and will process it to completion (either alone or in combination with one or more other processors) before becoming available for starting another task. If a physical resource of a parallel processing system can process more than one task at the same time, it is viewed simply as more than one processor.

It is assumed also that each job has an execution time which is a nonincreasing function of the number of processors allotted to it. The execution time for a job cannot increase with an increase in the number of processors allocated to execution of the job because if the USE of an additional processor actually makes the job take longer to complete, then the best schedule would just IDLE that added processor, so that the execution time for the job at least would not increase as a consequence of adding another processor.

The problem is to find an allotment of processors (i.e., number of processors to use) for each job, and, overall, a schedule assigning the tasks of all of the jobs to the processors which respects any precedence constraints, in a manner which minimizes the completion time of the last task to finish.

Consider therefore a multiprocessor computer system consisting of P processors, and a set of N tasks which are to be scheduled on this system. The tasks may be partially ordered by a precedence relation $<$. Assume that each task $j\epsilon\{1, \ldots, N\}$ can be allotted an arbitrary number of processors $\beta_j\epsilon\{1, \ldots, P\}$, and that its task execution time $t_j(\beta_j)>0$ is a nonincreasing function of the number of allotted processors. All of the processors allotted to a task are required to execute that task in unison. That is, these $\beta_j$ processors are all required to start task j at some starting time, say $\tau_j$. They will then complete task j at some later completion time $\tau_j+t_j(\beta_j)$. A schedule will consist, for each task $j\epsilon\{1, \ldots, N\}$, of a processor allotment $\beta_j$, and a starting time $\tau_j$. A schedule is required to be legal in the following two senses:

For any time $\tau$, the number of active processors does not exceed the total number of processors. In other words, $$\sum_{\{j|\tau_j\leq\tau<\tau_j+t_j(\beta_j)\}} \beta_j \leq P.$$

If one task $j_1$ has precedence over another task $j_2$ then the second task cannot begin until the first task completes. In other words, if $j_1<j_2$, then $\tau_{j1}+t_{j1}(\beta_{j1})\leq\tau_{j2}$.

The problem is to find an optimal schedule, one For which the overall makespan given by $$\max_{1\leq j\leq N} \{\tau_j + t_j(\beta_j)\}$$

is minimized. In other words, the goal is to minimize the latest task completion time. This will be called the malleable scheduling problem.

FIG. 1 is a block diagram illustrating the malleable scheduling problem for three jobs. The input consists of the tasks of the three jobs, represented by the nodes of a graph, and the precedence relationships, represented by the edges (i.e., interconnecting lines). If two nodes are connected by an edge, then the task corresponding to the lower node must complete before the task corresponding to the upper node begins. The scheduling procedure yields as output a schedule of the tasks which respects the precedence relationships. The processors are shown on the horizontal axis, and time on the vertical axis. The makespan of the schedule is also denoted.

In "Complexity of Scheduling Parallel Task Systems", SIAM Journal of Discrete Mathematics (1989), J. Du and J. Leung show that the malleable scheduling problem is NP-hard in the strong sense, even in the special case when there are no precedence constraints. (Mathematically, this means that is highly unlikely that an efficient procedure can be found to find a totally optimal solution to the problem.) No procedure for attempting a solution is developed in this work.

In "Scheduling and Processor Allocation For the Execution of Multi-Join Queries in a Multiprocessor System", Proc. IEEE Conference on Data Engineering (1992), M.-S. Chen, P. Yu and K.-L. Wu consider the malleable scheduling problem in the context of a single query with precedence and general task execution times. The case of multiple queries is not considered in this work, and the procedure developed for a single query finds a solution which is not always very effective.

The nonprecedence version of the malleable scheduling problem is studied in three earlier works. Each of these works considered general task execution times and each proposed one or more procedures.

In "Approximate Algorithms for Scheduling Parallelizable Tasks", Proc. Symposium on Parallel Algorithms and Architectures (1992) by J. Turek, J. Wolf and P. Yu, a class of malleable procedures is presented, each of which is based on procedures for nonmalleable scheduling without precedence, and each of which matches the worst case asymptotic performance of the corresponding simpler procedure. However, precedence is not considered in this work.

In "Scheduling Parallelizable Tasks: Putting it all on the Shelf", Proc. ACM Sigmetrics Conference (1992) by J. Turek, J. Wolf, K. Pattipati and P. Yu, a shelf procedure is developed which is optimal over the set of all possible shelf-based solutions. (Shelf solutions represent a class of approaches to solving scheduling problems.) Again, precedence is not considered in this work.

The procedure presented in "An Approximation Algorithm for Scheduling Tasks on Varying Partition Sizes in Partitionable Multiprocessor Systems", IBM Research Report 15900 (1990) by R. Krishnamurthi and E. Ma solves what amounts to the special case of packing parallelizable tasks onto a single shelf. Therefore, precedence is also not considered in this work.

SUMMARY OF THE INVENTION

It is therefore an object of the present invention to provide an efficient and effective solution to the malleable scheduling problem for tasks with precedence.

Another object is to provide a method for scheduling a plurality of jobs on a parallel processing system, each job consisting of one or more tasks among which there may be precedence constraints.

It is also an object to provide a method for efficiently scheduling a plurality of database queries on a parallel processing system.

These and further objects and advantages have been achieved by the present invention, which provides an efficient procedure for determining an effective solution to the malleable scheduling problem by using two separate stages of scheduling (herein called the second and third stages of the procedure), only the first of which involves precedence constraints.

In a first stage of the procedure (which is preliminary and often optional), the total set of tasks to be scheduled is partitioned into jobs such that each precedence constraint affects only a single job (i.e., all of the tasks upon which a particular task depends for an input are also contained within the same job as that particular task). In many circumstances, suitable jobs which satisfy this condition might already exist and make any actual computation in this first stage unnecessary. This is generally the case, for example, with database queries where each query ordinarily already inherently satisfies this condition. In such a case it is only necessary to define each query as a separate job.

In a second stage of the procedure (which is the first stage of actual scheduling), each job is optimally scheduled separately a plurality of times (once for each different number of processors which might possibly be assigned to the execution of that job) and each of these alternative optimum schedules for each job (herein sometimes called the task schedules) is created while respecting any precedence constraints among the tasks of the job. An estimated job execution time for each of these alternative optimum schedules for each job is determined also and is recorded for use in a third stage of this procedure. Any known method for producing an optimum schedule that respects precedence may be used in this second stage. A preferred method for doing this is disclosed, which uses "dynamic programming".

In the third stage of the procedure (which is the second stage of actual scheduling), the sets of alternative estimated job execution times for each job produced in the second stage of this procedure are used as input to create an overall optimum schedule for all of the jobs. Since each of the precedence constraints has already been respected completely in the second stage (i.e., first scheduling phase), the third stage of this procedure may use any known method for producing this optimum overall schedule from the estimated job execution times produced in the second stage. There are no precedence constraints to respect in this third stage of the procedure because only jobs are being scheduled in this stage and there are no precedence constraints between the jobs because in the first stage of this procedure the jobs were defined so that there would be no such precedence constraints between jobs. This was done deliberately in order to allow for the use of any scheduling method in this third stage.

In the third stage of this procedure, a particular member of each of the sets of estimated job execution times (one set for each job) created in the second stage of the procedure is selected along with the number of processors corresponding to that selection and an overall schedule for the jobs is created using these selections. In general, a number of different choices for allocation of processors to jobs is similarly scheduled. The overall schedule having the minimum completion time for all of the jobs is selected as the optimum overall schedule. A preferred method of doing this is described.

In a described preferred method for the third stage, from each set of estimated job execution times, an efficient member of the set is selected (i.e., one that appears to be efficient in the sense that the number of processors being used in relation to the corresponding estimated job execution time appears to reflect an efficient use of the processors allotted to the execution of that task; the one with the smallest product of estimated job execution time and number of processors used is preferred) and the number of processors corresponding to this member is tentatively selected as an initial number of processors allotted to that job. Using this initial tentative selection of a number of processors to allot to each job, an overall schedule is created using any known two dimensional bin packing algorithm. An estimated overall execution time for all of the jobs for this initial set of processor allotments is determined and recorded and the overall schedule analyzed for wasted (or idle) processor time. If there is wasted processor time, the job which is associated with the most wasted processor time is identified, the number of processors allotted to that job is increased by one, and a new overall schedule is created. An overall execution time for this new overall schedule is also estimated and recorded if it is better than the best one previously recorded. The new overall schedule is also analyzed for wasted processor time. This process continues until there is no wasted processor time, at which time the overall schedule that has produced the best (i.e., minimum) overall execution time is selected as the optimum schedule and used to execute the jobs.

In the preferred method for the second stage, the tasks of a job are first sorted into a topological order, which is an ordering that respects all of the precedence constraints among the tasks of the job. The topological ordering may be represented as a tree of tasks with the branch intersections and leaves being the tasks of the job and the branch interconnections representing the precedence constraints among the tasks.

Then, starting with the leaves and working back towards the trunk of the tree, each task (and all of the children tasks of that task) are optimally scheduled multiple times (i.e., once for each possible number of processors which might be used to execute that task and its children tasks, if any) to create a set of possible alternative optimal schedules for that task (one alternative optimal schedule for each possible number of processors which might be allotted to that task). Whenever a task is being optimally scheduled multiple alternative times (once for each different processor allotment possibility) and the task has one or more children tasks, the children tasks are also optimally scheduled along with the parent task. This is done to respect precedence constraints. To do this efficiently, use is made of the set of optimum schedules and estimated execution times for the children tasks which were produced when the children tasks were individually optimally scheduled multiple alternative times earlier in the procedure.

If the task has two children tasks which can be executed in parallel as well as in series (because there is no precedence constraint between the two children tasks), an optimum schedule for each processor allotment number is determined by creating alternative schedules with those children tasks being done in parallel with each other as one possibility and in series with each other as an alternative possibility and, of course, separately for each possible allotment of processors to each child task when they are scheduled in parallel with each other.

With respect to each task, an optimum schedule is created for each possible number or processors which might be allotted to that task and these optimum schedules are recorded (along with the estimated execution time for each such optimum schedule). As mentioned earlier, the set of optimum schedules and estimated execution times for a child task is used to optimally schedule the parent task(s) of that child task and the final parent task in a job (i.e., the root task) produces a set of optimum schedules and corresponding estimated execution times that becomes the set used for that job in the third stage.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT

Figure 1:
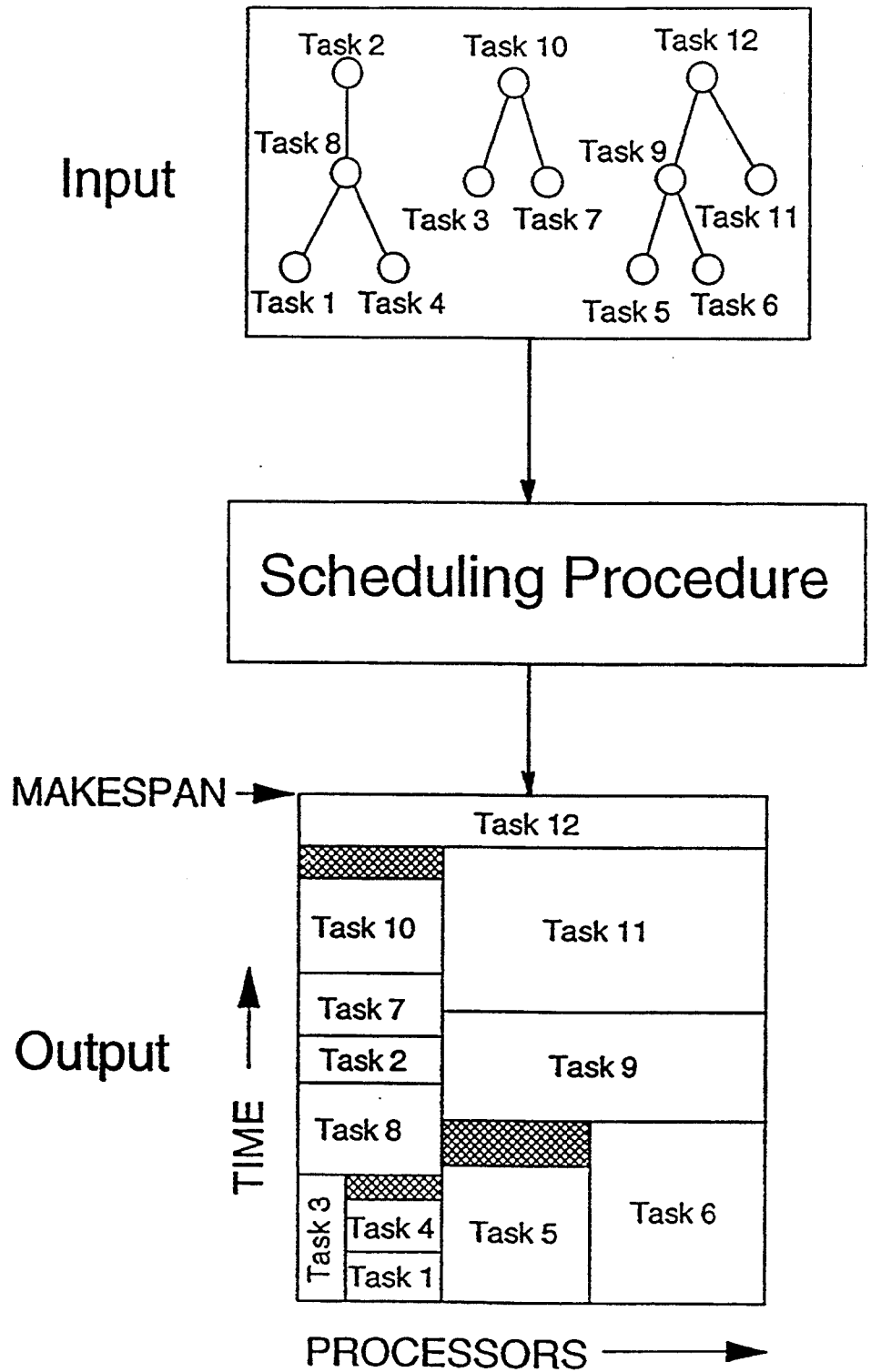
FIG. 1 is a high level flow diagram indicating the input and output of the malleable scheduling problem.
Figure 2:
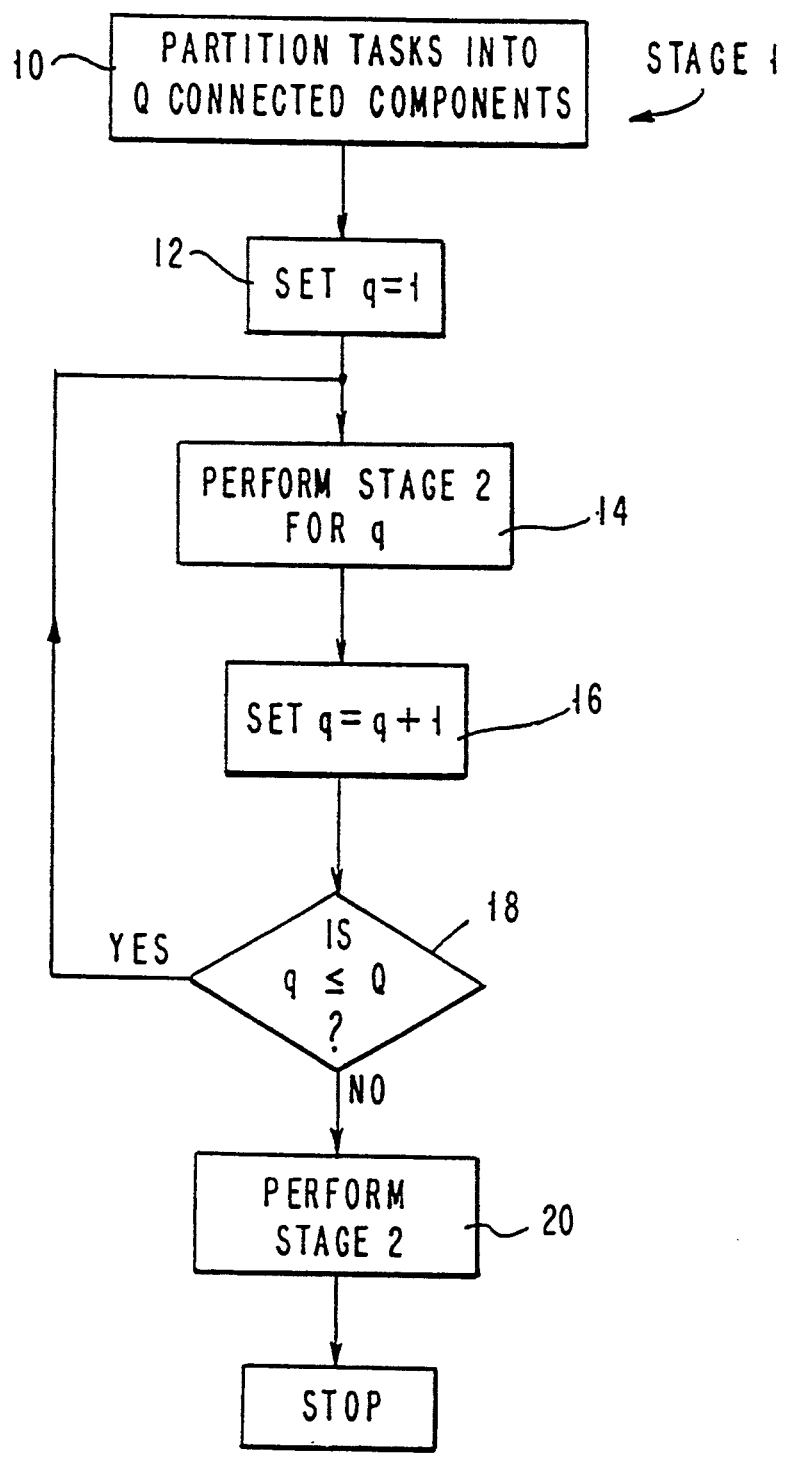
FIG. 2 is a high level flow diagram of the three stages of a procedure in accordance with this invention.

In the following description, it is assumed for the sake of simplicity that the precedence constraints between the tasks forms a forest of trees. (Mathematically, this means that the set, of all nodes which are connected via a sequence of edges to a given node forms a tree. This set is called the connected component of the given node. A collection of such trees is called a forest.) This assumption can be relaxed. Referring now to the drawings, and more particularly to FIG. 2, there is shown a block diagram of the stages of the invention.

Stage 1, shown in block 10, is the preparatory stage of the invention. Stage 1 provides for the partitioning of the tasks into connected components, so that $i < j$ if and only if both i and j are in the same partition. In other words, each q corresponds precisely to a tree in the forest. Suppose that there are Q such connected components. A procedure for the partitioning can be found in Algorithms by T. Corem, C. Leiserson and R. Rivest, McGraw Hill (1992), pages 441–442. It will be convenient to think of each of the Q sets of tasks as consisting of a single job. (Of course, if the identities of the jobs are known a priori, no such procedure will be required as a preparatory phase.) In a representative database example, the jobs would correspond to individual queries, and the tasks to steps within the queries. The identities of the queries are likely to be known in advance.

The remainder of the invention is hierarchical in nature. There are two additional stages, namely Stage 2 and Stage 3.

The evaluation of Stage 2 for a given job q between 1 and Q is shown in block 14. This evaluation is initiated in block 12 and controlled by blocks 16 and 18. Stage 2 determines, for each number of processors p between 1 and the total number of processors P, a schedule for each of the tasks within the job q. This schedule obeys the relevant precedence constraints. A byproduct of the repeated application of this stage is the computation of the job execution time for each q and each p. A more detailed description of Stage 2 will be given below.

Stage 3 is shown in block 20. This stage determines a schedule for the Q jobs, which have no precedence constraints between them. Stage 3 uses the output of Stage 2 as input. A more detailed description of Stage 3 will be given below.

Figure 3:
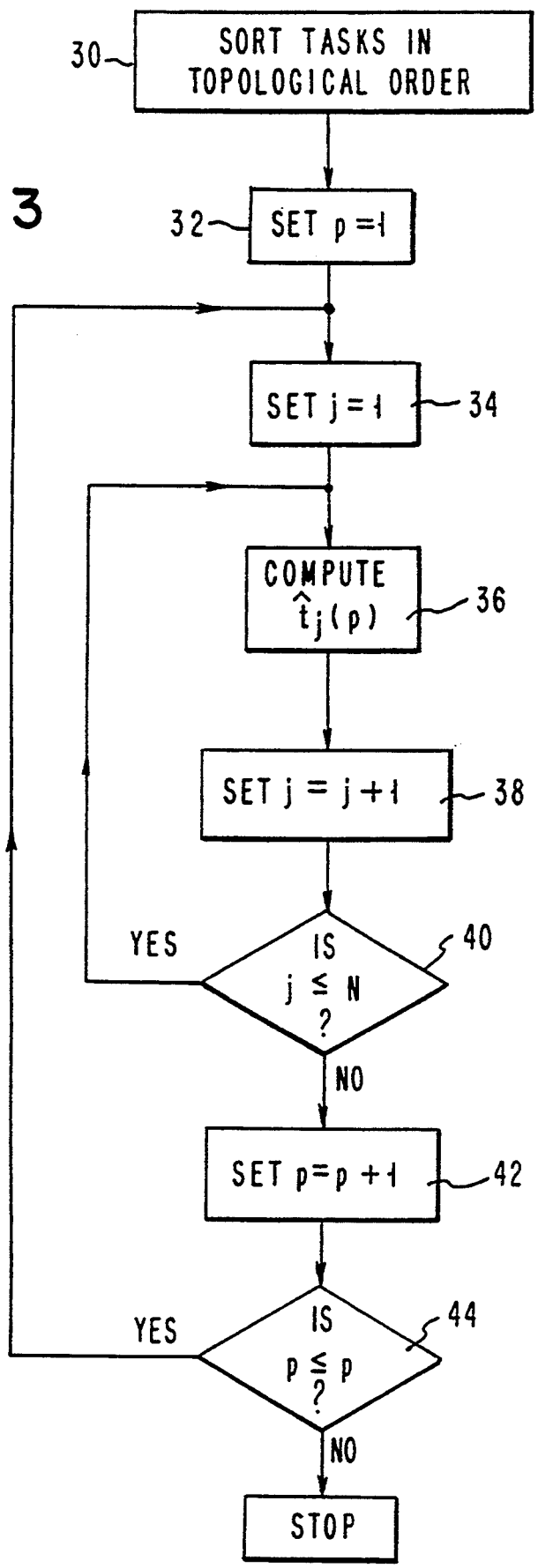
FIG. 3 is a flow diagram of second stage of the FIG. 2 procedure.

The details of Stage 2 are depicted in the block diagram in FIG. 3. In order to understand the nature of the Stage 2 procedure, consider the job precedence tree shown in FIG. 4. (The nodes represent tasks. If two nodes are connected by an edge, then the task corresponding to the lower node must complete before the task corresponding to the upper node begins.) Stage 2 is a successive refinement procedure in the sense that it obeys the following property: Given that a task is allotted to certain processors, all of its children (and consequently all of its entire offspring) will be allotted to subsets of those processors. Thus the Stage 2 procedure respects the structure of the precedence tree in a very strong way.

Figure 4:
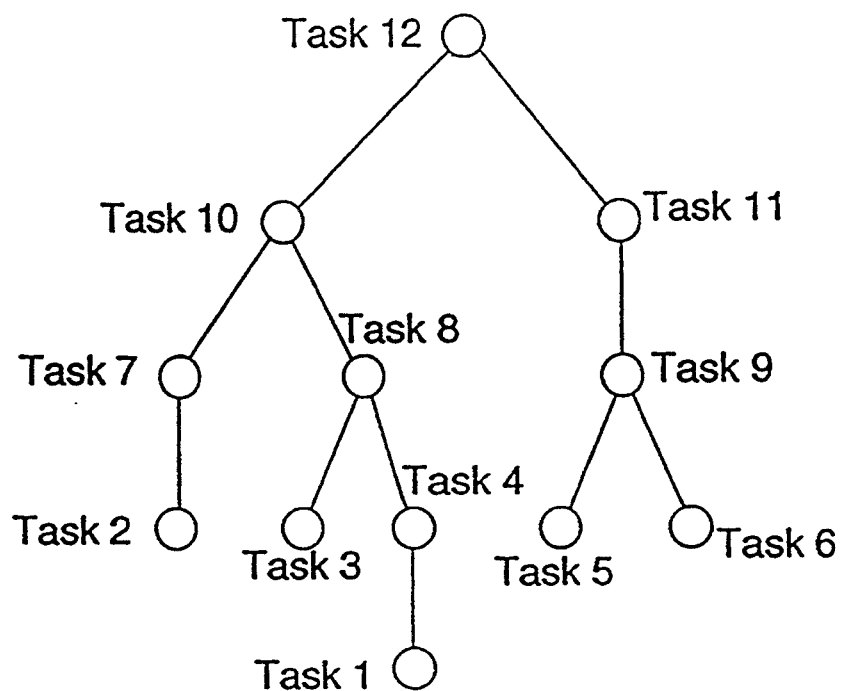
FIG. 4 is an example of a job precedence tree.
Figure 5:
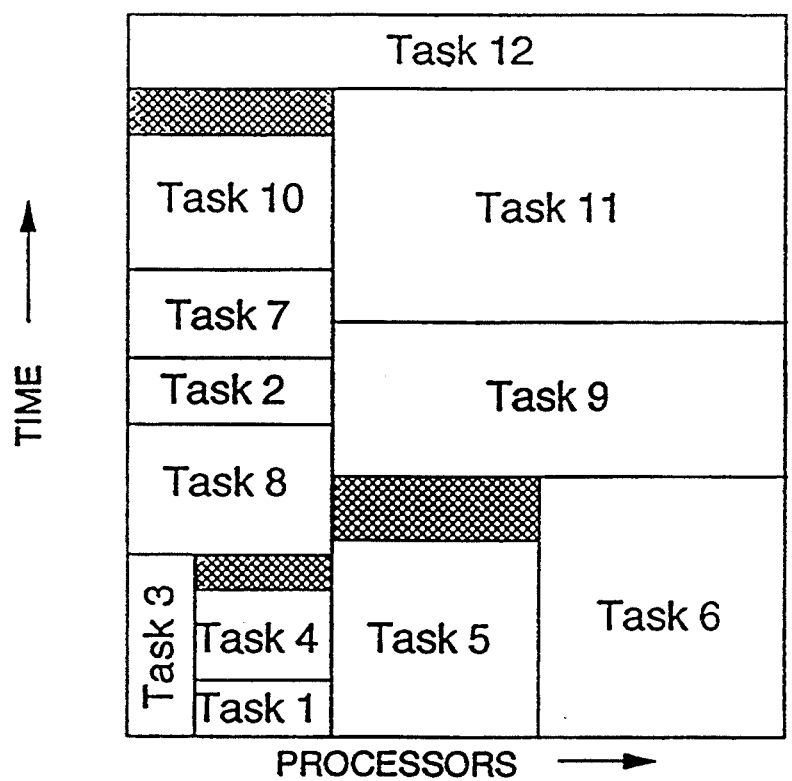
FIG. 5 is an example of a second stage solution to the example of FIG. 4.

FIG. 5 illustrates a possible Stage 2 solution for the job shown in FIG. 4. The hatched area represents wasted work. The horizontal axis represents processors, and the vertical axis represents time. Notice that the root task (node 12) is allotted all the processors. The two children of node 12, namely nodes 10 and 11, are themselves roots of subtrees. The entire subtree associated with node 10 is packed to the left of the entire subtree associated with node 11, in a manner which can be characterized as parallel. Continuing down the left subtree, consider the trees associated with the children of node 10, namely those of nodes 7 and 8. The subtree associated with node 7 is packed above the subtree associated with node 8, in a manner which can be characterized as batch. In fact, the Stage 2 procedure obeys the property that the subtrees associated with all children of a given node are packed in either a parallel or a batch fashion.

The Stage 2 procedure finds the optimal schedule respecting the two properties given above. Refer again to FIG. 3. Specifically, Stage 2 of the invention begins by ordering the tasks topologically, so that $j_1 < j_2$ implies $j_1 < j_2$. This is shown in block 30. A procedure for topological sorting may be found in Algorithms by T. Corem, C. Lciscrson and R. Rivest, McGraw Hill (1992), pages 485–488. Then it proceeds according to this ordering, from the leaf nodes up, from smaller numbers of processors to larger numbers of processors, using dynamic programming. Define $\hat{t}_j(p)$ to be the optimal makespan found by the Stage 2 procedure for task j and all its offspring utilizing p processors, where $1 \leq p \leq P$. In order to generate $\hat{t}_j(p)$, the Stage 2 procedure packs task j using p processors, and adds below task j all of the packings of subtrees of the children of j, packed in either (a) a batch fashion or (b) the best possible parallel fashion, whichever is better.

Block 36 shows the evaluation of $\hat{t}_j(p)$ for a given task j and number of processors p. The initiation of the p loop is shown in block 32, and the loop is controlled by blocks 42 and 44. The initiation of the j loop is shown in block 34, and the loop is controlled by blocks 38 and 40. To compute $\hat{t}_j(p)$, let CH$j$ denote the number of children of j. If CH$_j$=0 then we set $\hat{t}_j(p) = t_j(p)$. If CH$_j$=1 then we set $\hat{t}_j(p) = t_j(p) + \hat{t}_{ch1j}(p)$. If CH$_j$=2 then we set $\hat{t}_j(p) = t_j(p) + \min\{\hat{t}_{ch1j}(p) + \hat{t}_{ch2j}(p), \min_{1<q<p}\max\{\hat{t}_{ch1j}(q), \hat{t}_{ch2j}(p-q)\}\}$, and so on. An application of the Stage 2 procedure to job q yields the job execution times $T_q(p) = \hat{t}_1(p)$ for each number of processors p between 1 and P.

Figure 6:
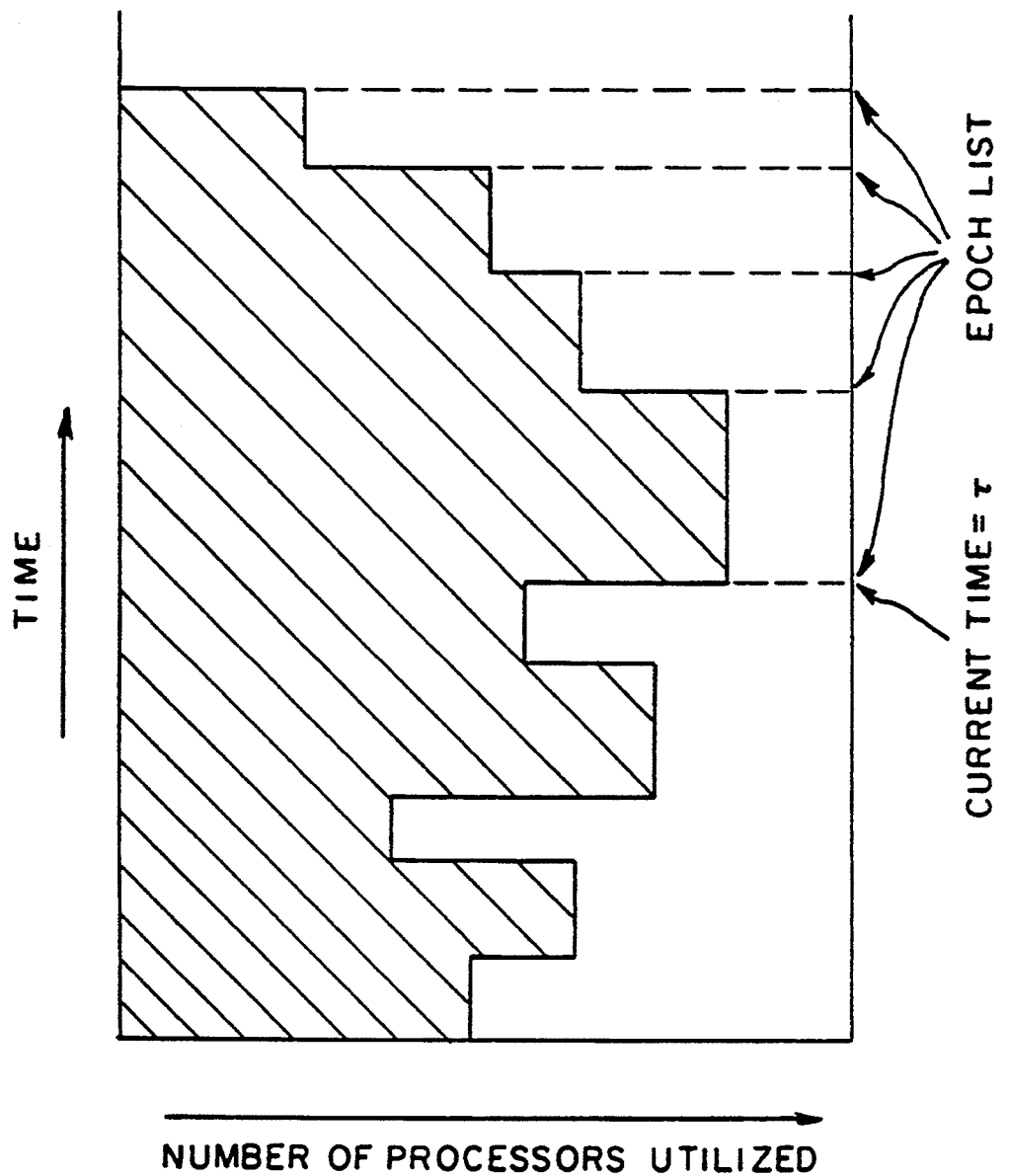
FIG. 6 is a histogram used by the SUB procedure in the third stage of the FIG. 2 procedure.
Figure 7:
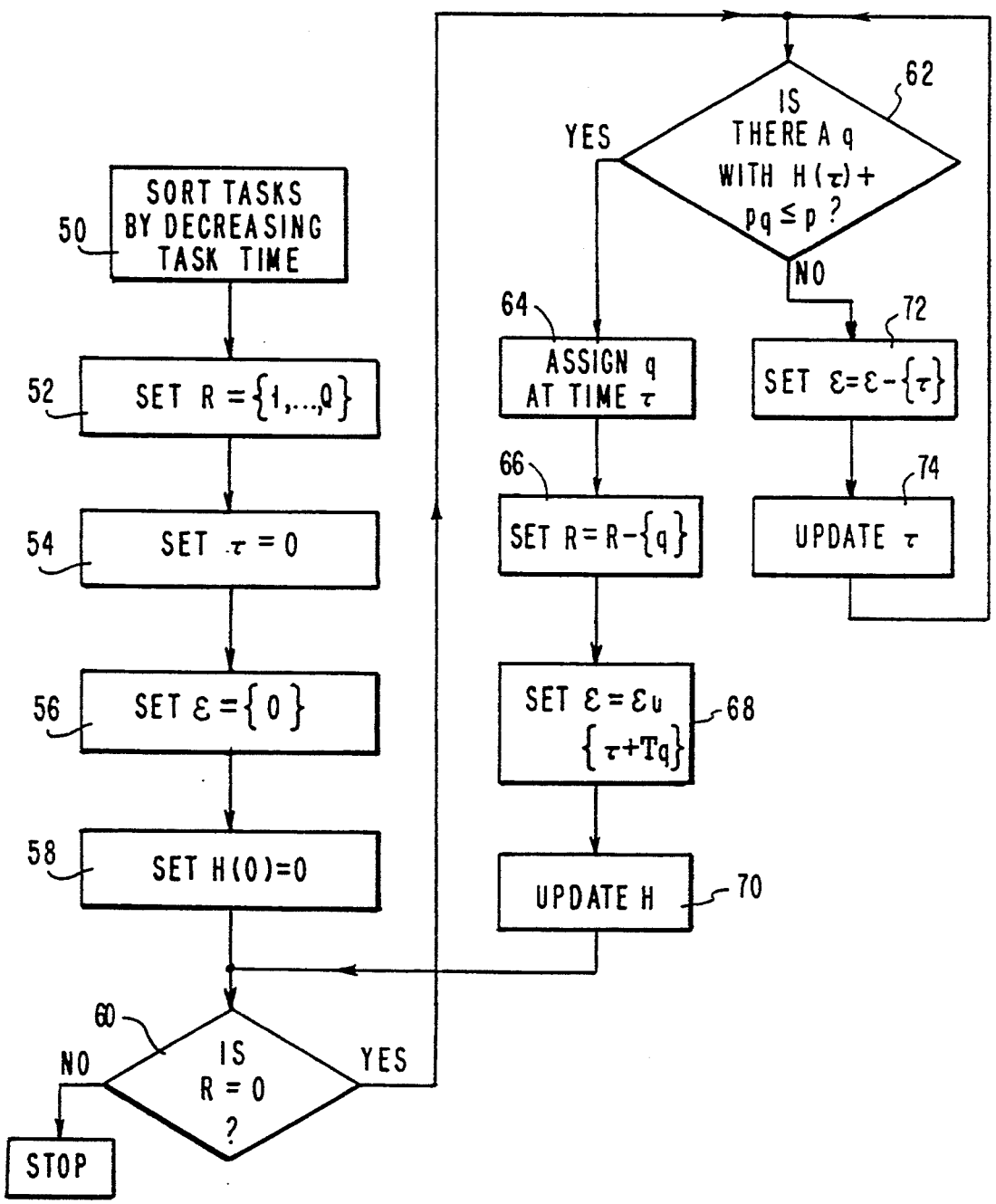
FIG. 7 is a flow diagram of the SUB routine in third stage of the FIG. 2 procedure.

The Stage 3 procedure uses as a subroutine the procedure SUB. In this subroutine, each job q is regarded as being performed on a fixed number of processors $p_q$, and thus executes in a fixed amount of time, say $T_q$. The subroutine finds a schedule for such tasks in the absence of precedence constraints. SUB makes use of a histogram of the number of processors to be utilized as a function of time. Such a histogram is shown as the shaded portion of FIG. 6. The horizontal axis corresponds to the number of processors to be utilized. The vertical axis represents time. As tasks are scheduled to start and complete, the shape of the histogram changes. The details of the SUB procedure are depicted in the block diagram in FIG. 7. First, in block 50, the tasks are sorted in order, from longest task execution time to shortest. Thus q$_1$ appears before q$_2$ on the list provided $T_{q1} > T_{q2}$. Block 52 depicts the creation of an ordered ready list, initially all tasks $\{1, \ldots, Q\}$. An ordered list of time epochs E is also maintained. The so-called current time $\tau$ is always the smallest time on the epoch list. (The epoch list will consist, in fact, of all task completion times from the current time onward.) Initially the list consists only of time $\tau = 0$, so that is the current time at the start of the procedure. These initializations are depicted in blocks 54 and. 56. The initial histogram will, of course, be identically 0, as shown in block 58. Current time will never decrease during the execution of SUB. Furthermore, tasks are allotted to processors as the procedure executes, always at a start time equal to the current time, so that the start time of a task will be at least as large as the start time of any previously allotted task.

As shown in block 60, the general procedural steps are repeated until the ready list is empty. Here is the general step: Considering FIG. 6, suppose that the current time $\tau$ is as shown. The number of processors available (that is, not utilized) at this time can be read from the histogram. SUB searches the ready list for a task requiring no more than that number of processors. The test for the existence of such a task is block 62. If such tasks exist, the first one q on the list is chosen, assigned a starting time equal to $\tau$ in block 64, and thus a completion time equal to $\tau + T_q$. Task q is removed from the list in block 66, the time $\tau + T_q$ is added to the epoch list in block 68, and the histogram is updated by setting H($\hat{\tau}$) to be H($\hat{\tau}$)+$p_q$ for all $\hat{\tau}$ in E such that $\hat{\tau} - \tau < T_q$ in block 70. If no such task exists, the current time $\tau$ is removed from the epoch list in block 72, and the next smallest time on the epoch list becomes the new current time in block 74. The histogram will always be monotonically nonincreasing beyond the current time. Therefore, checking processor availability at the start time of a task is sufficient—if the task can start, it can execute to completion on the same processors without interference.

Figure 8:
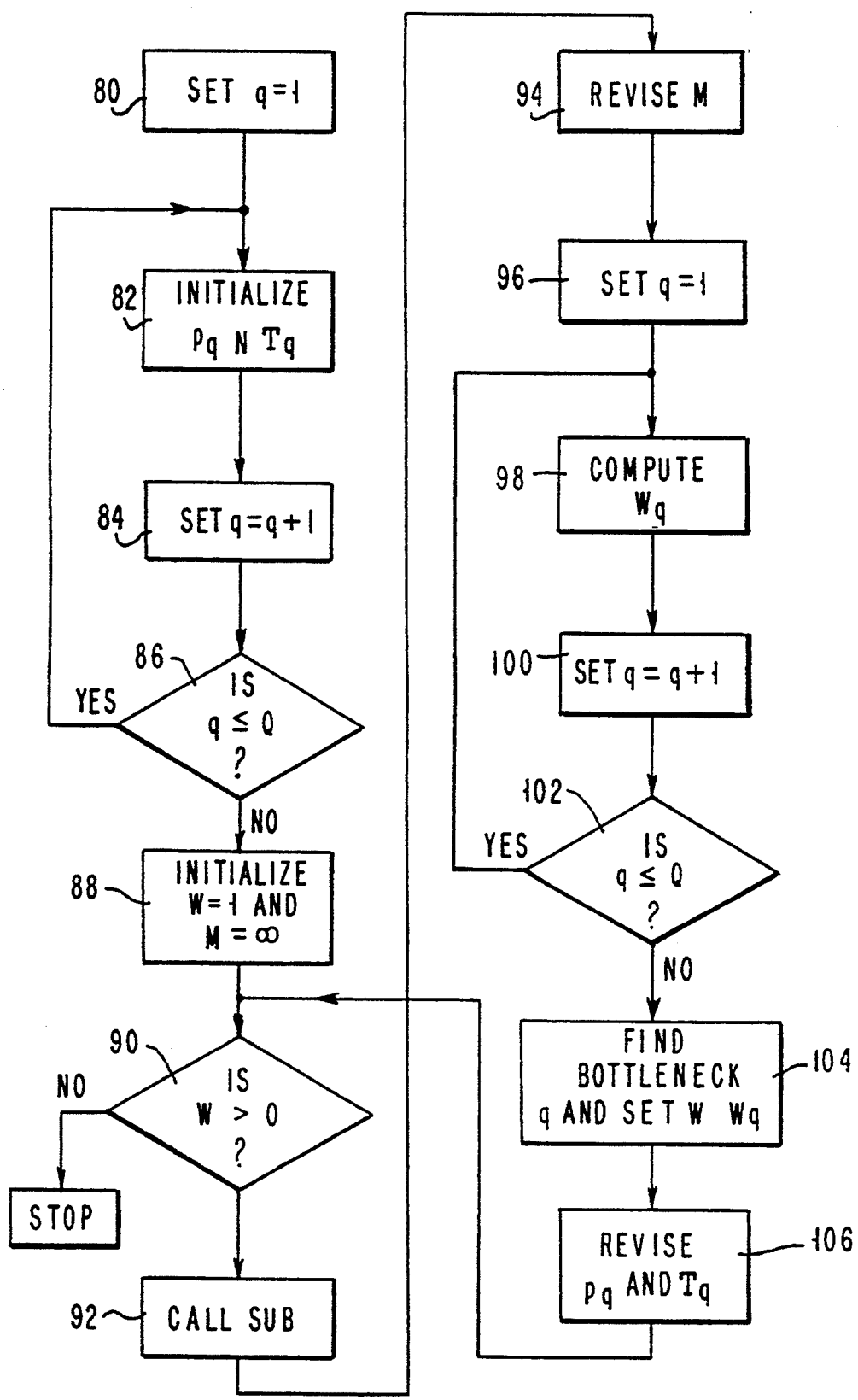
FIG. 8 is a flow diagram of the third stage of the FIG. 2 procedure.

Next we describe Stage 3 itself. Refer to the block diagram in FIG. 8. For each job q, start with a number of processors $p_q$ such that the total work $p_q t_j(p_q)$ is minimized, and set $T_q = t_q(p_q)$. This is indicated in block 82. The initiation of the q loop is shown in block 80, and the loop is controlled by blocks 84 and 86. In block 88 the wasted work W is set to be nonzero and the best makespan M found to date is set to be large. As shown in block 90, the general step is repeated until the wasted work W is driven to 0. Here is the general step: Call SUB for the nonmalleable scheduling problem, as shown in block 92. In block 94 the best makespan M found to date is revised to be the minimum of the previous value of M and the makespan found by the execution of the SUB procedure. Now the function P−H($\tau$) denotes the number of nonutilized processors at each time $\tau$. One can associate with each task q the amount of wasted work that occurred during the time q was executing. That is, set $$W_q = \int_{T_q}^{T_q + \tau_q} (P - H(\tau)) d\tau.$$

This calculation is indicated in block 98. The initiation of the q loop is shown in block 96, and the loop is controlled in blocks 100 and 102. Regard the task with the largest value $W_q$ as the bottleneck task, and revise the wasted work W to be this maximum, as shown in block 104. For that task q, increase the number of processors to be that value $p > p_q$ with the minimal amount of work $pT_q(p)$. Then reset $p_q = p$, $T_q = T_q(p_q)$, as shown in block 106. Now call SUB again, block 92. The procedure will terminate in a finite number of steps, with the bottleneck driven to 0, that is, with the wasted work $W_q = 0$ for all q. The best makespan obtained to date is the final solution.

While the invention has been described in terms of a preferred embodiment, those skilled in the art will recognize that the invention can be practiced with modifications within the spirit and scope of the appended claims.

What is claimed is:

1. A method of scheduling a multiplicity of tasks having precedence, constraints on a plurality of processors operating in parallel, comprising the steps of:
   (a) defining a plurality of jobs, each of said jobs comprising a portion of said tasks and precedence constraints relating pairs of said tasks which are included only within a single job;
   (b) for each said job, creating a plurality, of task schedules for said tasks of said job, each of said task schedules corresponding to a different number of said processors which might possibly be allotted to said job and respecting any precedence constraints among said tasks of said job;
   (c) determining an estimated job execution time for each of said task schedules;
   (d) using said estimated job execution times for each of said jobs and for each different number of processors which might be allocated to each of said jobs, determining an allotment of processors for each of said jobs;
   (e) creating a job schedule for said jobs using said determined allotments; and
   (f) executing said jobs on said processors using a job schedule created in step (e).

2. A method as defined in claim 1 wherein said jobs defined in step (a) are each defined as a database query.

3. A method as defined in claim 1 wherein step (b) includes the step of ordering said tasks within said job in a manner which respects precedence constraints for said tasks of said job.

4. A method as defined in claim 3 wherein step (b) further includes the step of determining for each possible number of processors from one to all of said plurality of processors and for each said task within said job a minimum completion time for said task while respecting precedence constraints among said tasks.

5. A method as defined in claim 1 wherein step (d) includes the step of computing the product of estimated job execution time and number of processors corresponding thereto for each of said task schedules and an initial allotment of processors for each of said jobs corresponds to a minimum one of such computed products for each of said jobs.

6. A method as defined in claim 1 wherein said job schedule created in step (e) is created using a two dimensional bin packing method.

7. A method as defined in claim 1 and further comprising the step of analyzing said job schedule created in step (e) for idle processor time within any of said jobs in said job schedule, and if there is such idle processor time, refining said allotments determined in step (d) and creating a new job schedule based on said refined allotments.

8. A method as defined in claim 7 wherein said refining of allotments includes an increase by one processor in said allotment of processors to said job having a maximum amount of idle processor time within said job.

9. A method for scheduling a plurality of separate jobs on a computing system having a multiplicity of processors operating in parallel, each of said jobs comprising at least one task and at least some of said jobs consisting of a plurality of tasks among which there may be precedence constraints, said processors being each capable of executing a separate task simultaneously, comprising the steps of:
   (a) creating a set of estimated job execution times for each job, each said estimated job execution time in any said set corresponding to a different number of said processors which might possibly be dedicated to the execution of said each job, said estimated job execution times being created while obeying any precedence constraints for tasks which comprise said each job;
   (b) for each said estimated job execution time, computing the product of job execution time and number of processors corresponding thereto;
   (c) for each said set of estimated job execution times, identifying a minimum one of said computed products therefor and tentatively assigning said number of processors corresponding to said identified minimum product for execution of said each job;
   (d) creating a tentative overall schedule for execution of all of said jobs in parallel by applying a two dimensional packing algorithm to said tasks within each of said jobs using said tentatively assigned number of processors for each said job;
   (e) estimating an overall execution time corresponding to said tentative overall schedule and recording said estimated overall execution time;
   (f) determining whether there is any idle processor time in said tentative overall schedule;
   (g) if so, identifying a job in said overall schedule which has less than a maximum number of processors tentatively assigned for execution of said identified job and which is associated with a maximum amount of idle processor time:
   (h) increasing the number of processors tentatively assigned for execution of said identified job;
   (i) repeating steps (d)through (f) until said idle processor time in said tentative overall schedule cannot be further reduced thereby; and then
   (j) selecting a minimum overall execution time from said recorded overall execution times and using said tentative overall schedule which corresponds to said minimum recorded overall execution time for executing said jobs in parallel on said processors.

* * * * *